(12) United States Patent
Oyabu et al.

(10) Patent No.: US 7,555,170 B2
(45) Date of Patent: Jun. 30, 2009

(54) IMAGE PROCESSING APPARATUS FOR SCALING IMAGES

(75) Inventors: Hiroyuki Oyabu, Kanagawa (JP); Kenji Takeuchi, Saitama (JP); Terutake Hayashi, Kanagawa (JP); Masahiko Kikuchi, Kanagawa (JP); Hideki Yamasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 490 days.

(21) Appl. No.: 10/806,172

(22) Filed: Mar. 23, 2004

(65) Prior Publication Data

US 2004/0190791 A1     Sep. 30, 2004

(30) Foreign Application Priority Data

Mar. 24, 2003   (JP)   ............................... 2003-081275

(51) Int. Cl.
  *G06K 9/32*   (2006.01)
  *G06K 9/00*   (2006.01)
(52) U.S. Cl. ........................................ 382/298; 382/154
(58) Field of Classification Search ................... 382/298
  See application file for complete search history.

(56) References Cited

U.S. PATENT DOCUMENTS

| | | | | |
|---|---|---|---|---|
| 5,097,518 A | * | 3/1992 | Scott et al. | 382/298 |
| 5,297,217 A | * | 3/1994 | Hamilton et al. | 382/296 |
| 5,461,704 A | * | 10/1995 | Wakabayashi et al. | 358/1.15 |
| 5,473,741 A | * | 12/1995 | Neufelder et al. | 345/619 |
| 5,825,367 A | * | 10/1998 | Shyu et al. | 345/668 |
| 6,498,868 B1 | * | 12/2002 | Klassen | 382/298 |

FOREIGN PATENT DOCUMENTS

| | | |
|---|---|---|
| JP | A 4-367080 | 12/1992 |
| JP | A 08-102850 | 4/1996 |
| JP | A 2001-150739 | 6/2001 |

\* cited by examiner

*Primary Examiner*—Bhavesh M Mehta
*Assistant Examiner*—David P Rashid
(74) *Attorney, Agent, or Firm*—Oliff & Berridge, PLC

(57) ABSTRACT

An image processing apparatus for generating scaled image data includes a receiver that receives an input of pixel value information of each pixel which is contained in image data to be processed in raster scan order, a first memory that stores the pixel value information input in the raster scan order, a destination address generator that generates destination address information in the second memory to specify a destination location of the pixel value information stored in the first memory in response to the specified scaling factor, and a transferring unit that transfers the pixel value information from the first memory to the second memory based on the generated destination address information.

18 Claims, 9 Drawing Sheets

FIG. 8

| CLOCK | OUTPUT VALUE OF FIRST SELECTION SECTION | DISABLE | SHIFT | SOURCE ADDRESS | TRANSFERRED PIXEL |
|---|---|---|---|---|---|
| 1 | 0.60 | 0 | 0 | 0 | P0, 0 |
| 2 | 1.35 | 0 | 1 | 0 | P0, 0 |
| 3 | 1.10 | 0 | 1 | 1 | P0, 1 |
| 4 | 0.85 | 0 | 0 | 2 | P0, 2 |
| 5 | 1.60 | 0 | 1 | 2 | P0, 2 |
| 6 | 1.35 | 0 | 1 | 3 | P0, 3 |
| 7 | 1.10 | 0 | 1 | 4 | P0, 4 |
| 8 | 0.85 | 0 | 0 | 5 | P0, 5 |
| 9 | 1.60 | 0 | 1 | 5 | P0, 5 |
| ⋮ | ⋮ | ⋮ | ⋮ | ⋮ | ⋮ |

FIG. 9

| CLOCK | OUTPUT VALUE OF FIRST SELECTION SECTION | DISABLE | SHIFT | SOURCE ADDRESS | TRANSFERRED PIXEL |
|---|---|---|---|---|---|
| 1 | 1.0 | 0 | 1 | 0 | P0, 0 |
| 2 | 1.5 | 0 | 1 | 1 | P0, 1 |
| 3 | 2.0 | 1 | 1 | 2 | - |
| 4 | 1.0 | 0 | 1 | 3 | P0, 3 |
| 5 | 1.5 | 0 | 1 | 4 | P0, 4 |
| 6 | 2.0 | 1 | 1 | 5 | - |
| 7 | 1.0 | 0 | 1 | 6 | P0, 6 |
| 8 | 1.5 | 0 | 1 | 7 | P0, 7 |
| 9 | 2.0 | 1 | 1 | 8 | - |
| ⋮ | ⋮ | ⋮ | ⋮ | ⋮ | ⋮ |

IMAGE PROCESSING APPARATUS FOR SCALING IMAGES

BACKGROUND OF THE INVENTION

1. Field of the Invention

This invention relates to an image processing apparatus for scaling image data.

2. Background Art

An image processing apparatus such as a printer generally accepts image data described in a language called page description language (PDL) from a personal computer, etc., and processes the image data. Specifically, an image generation section of the printer draws raster data while interpreting the description and transfers the raster data to a printer engine for printing out an image.

Such image data described in the page description language generally is vector data, etc., and the raster data is generated in the image generation section. Thus, it is a general rule that the raster data with the resolution of the printer engine can be generated immediately and the print result fitted for the resolution of the printer engine can be provided.

However, the raster data may be embedded in some image data described in the page description language. In such a case, the embedded raster data is output intact to the printer engine for providing the print result.

However, the raster data is not necessarily generated with the same resolution as that of the printer engine and therefore the image generation section scales the embedded raster data so that the raster data becomes the same resolution as the printer engine.

SUMMARY OF THE INVENTION

However, the image processing apparatus in the related art needs to be provided with a line buffer capable of retaining at least one line (as much as the width in a main scanning direction) of input image data. As the read method is simply changed, scaling in the main scanning direction and that in the subscanning direction cannot be performed at a time.

It is therefore an object of the invention to provide an image processing apparatus that can process input image data with the number of pixels in the main scanning direction exceeding the capacity of a buffer and can scale data in the main scanning direction and in the subscanning direction at a time.

According to one aspect of the invention, in order to achieve the object there is provided an image processing apparatus for receiving an input of pixel value information of each pixel and for generating scaled image data, the pixel being contained in image data to be processed in raster scan order, the scaled image data being obtained by scaling the image data according to a specified scaling factor. The image processing apparatus includes a first memory for storing the pixel value information input in the raster scan order, the first memory having a capacity equal to or less than a main scanning direction width of the image data, a second memory being capable of retaining the scaled image data as much as the main scanning direction width relative to a main scanning direction and at least a part of the scaled image data relative to a subscanning direction, a generating unit for generating destination address information in the second memory to specify a destination location of the pixel value information stored in the first memory in response to the specified scaling factor, and a transferring unit for transferring the pixel value information from the first memory to the second memory based on the generated destination address information.

According to another aspect of the invention, in order to achieve the object there is provided an image processing apparatus for receiving an input of pixel value information of each pixel and for generating scaled image data, the pixel being contained in image data to be processed in raster scan order, the scaled image data being obtained by scaling the image data according to a specified scaling factor. The image processing apparatus includes a first memory for storing the pixel value information input in the raster scan order, the first memory having a capacity equal to or less than a main scanning direction width of the image data, a second memory being capable of retaining the scaled image data as much as the main scanning direction width relative to a main scanning direction and at least a part of the scaled image data relative to a subscanning direction, a source address generating unit for generating a source address in the first memory based on an address shift amount determined in response to the specified scaling factor, the source address storing the pixel value information to be retained in each address in the second memory, and a transferring unit for transferring the pixel value information from the first memory to the second memory based on the generated source address information.

According to yet another aspect of the invention, in order to achieve the object there is provided an image processing method using a computer for receiving an input of pixel value information of each pixel and for generating scaled image data, the pixel being contained in image data to be processed in raster scan order, the scaled image data being obtained by scaling the image data according to a specified scaling factor. The image processing method includes storing the pixel value information input in the raster scan order in a first memory which has a capacity equal to or less than a main scanning direction width of the image data, and transferring the pixel value information from the first memory to a second memory. Preferably, the second memory is capable of retaining the scaled image data as much as the main scanning direction width relative to a main scanning direction and at least a part of the scaled image data relative to a subscanning direction, destination address information in the second memory to be a destination location is generated in response to the specified scaling factor, and the pixel value information stored in the first memory is transferred to the second memory based on the generated destination address information.

According to still another aspect of the invention, in order to achieve the object there is provided an image processing method using a computer for receiving an input of pixel value information of each pixel and for generating scaled image data, the pixel being contained in image data to be processed in raster scan order, the scaled image data being obtained by scaling the image data according to a specified scaling factor. The image processing method includes storing the pixel value information input in the raster scan order in a first memory which has a capacity equal to or less than the main scanning direction width of the image data, and transferring the pixel value information from the first memory to a second memory. Preferably, the second memory is capable of retaining the scaled image data as much as the main scanning direction width relative to a main scanning direction and at least a part of the scaled image data relative to a subscanning direction, a source address in the first memory storing the pixel value information to be retained in each address in the second memory is generated based on an address shift amount determined in response to the specified scaling factor, and the pixel value information is transferred from the first memory to the second memory based on the generated source address information.

According to still another aspect of the invention, in order to achieve the object there is provided an image processing program for realizing a processing to a computer to receive an input of pixel value information of each pixel and to generate scaled image data, the pixel being contained in image data to be processed in raster scan order, the scaled image data being obtained by scaling the image data according to a specified scaling factor. The image processing program includes storing the pixel value information input in the raster scan order in a first memory which has a capacity equal to or less than a main scanning direction width of the image data, and transferring the pixel value information from the first memory to a second memory. Preferably, the second memory is capable of retaining the scaled image data as much as the main scanning direction width relative to a main scanning direction and at least a part of the scaled image data relative to a subscanning direction, destination address information in the second memory to be a destination location is generated in response to the specified scaling factor, and the pixel value information stored in the first memory is transferred to the second memory based on the generated destination address information.

According to still another aspect of the invention, in order to achieve the object there is provided an image processing program for realizing a processing to a computer to receive an input of pixel value information of each pixel and to generate scaled image date, the pixel being contained in image data to be processed in raster scan order, the scaled image data being obtained by scaling the image data according to a specified scaling factor. The image processing program includes storing the pixel value information input in the raster scan order in a first memory which has a capacity equal to or less than the main scanning direction width of the image data, and transferring the pixel value information from the first memory to a second memory. Preferably, the second memory is capable of retaining the scaled image data as much as the main scanning direction width relative to a main scanning direction and at least a part of the scaled image data relative to a subscanning direction, a source address in the first memory storing the pixel value information to be retained in each address in the second memory is generated based on an address shift amount determined in response to the specified scaling factor, and the pixel value information is transferred from the first memory to the second memory based on the generated source address information.

BRIEF DESCRIPTION OF THE DRAWINGS

The present invention may be more readily described with reference to the accompanying drawings:

FIG. 8 is a schematic representation to show an example of transition of source address in scale-up processing; and FIG. 9 is a schematic representation to show an example of transition of source address in scale-down processing.

DETAILED DESCRIPTION OF THE PREFERRED EMBODIMENTS

Figure 1:
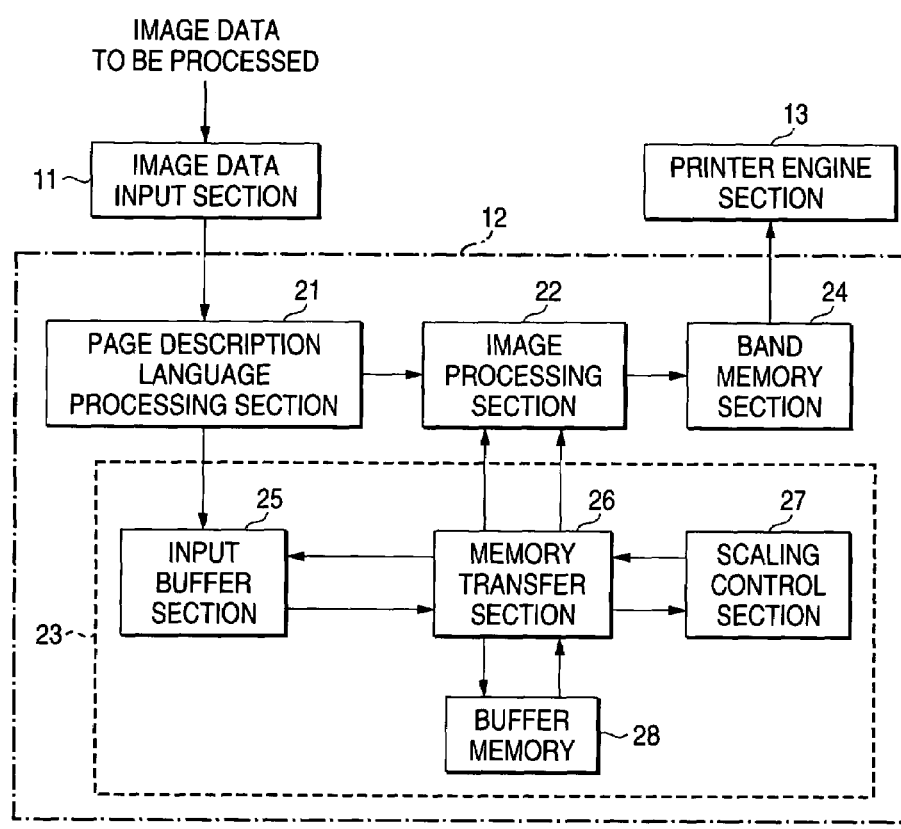
FIG. 1 is a block diagram to show the configuration of an image processing apparatus according to an embodiment of the invention.

Referring now to the accompanying drawings, there is shown a preferred embodiment of the invention. An image processing apparatus according to the embodiment of the invention is a printer controlled by a computer system and is made up of an image data input section 11, a raster data generation section 12, and a printer engine section 13, as shown in FIG. 1. The raster data generation section 12 includes a page description language processing section 21, an image processing section 22, a raster data processing section 23, and a band memory section 24.

Figure 2:
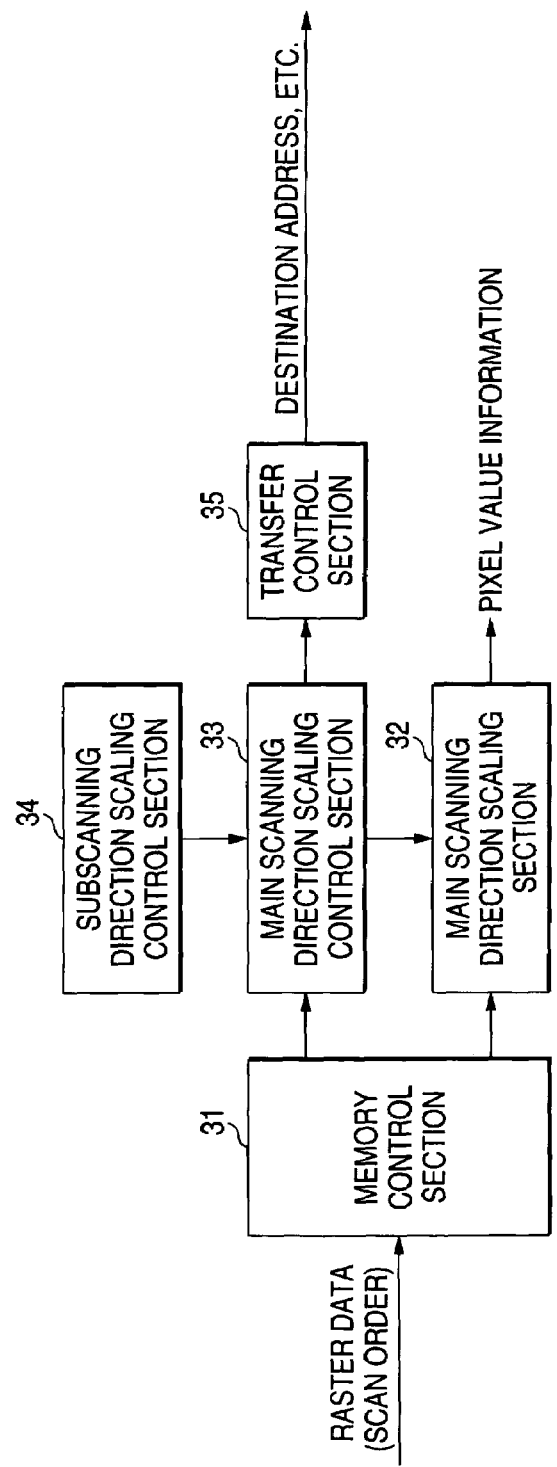
FIG. 2 is a functional block diagram to show a processing example of a raster data processing section.

Further, the raster data processing section 23 includes an input buffer section 25, a memory transfer section 26, a scaling control section 27, and buffer memory 28 as first memory. The scaling control section 27 operates in accordance with a program stored on a computer readable storage medium (not shown), such as a CD-ROM, a DVD-ROM, or a hard disk unit. The program is functionally made up of a memory control section 31, a main scanning direction scaling section 32, a main scanning direction scaling control section 33, a subscanning direction scaling control section 34, and a transfer control section 35, as shown in FIG. 2.

The image data input section 11 receives input of image data described in a predetermined page description language from an external personal computer, etc., and outputs the image data to the raster data generation section 12. The raster data generation section 12 generates raster data with the print resolution adopted in the printer engine section 13 (simply, the print resolution) based on the input image data, and outputs the raster data. The raster data generation section 12 is specifically described later. The printer engine section 13 prints out the image data on paper based on the raster data output by the raster data generation section 12.

The page description language processing section 21 of the raster data generation section 12 converts the description made in the page description language contained in the input image data into a description in a predetermined intermediate language, and outputs the description to the image processing section 22. The description in the intermediate language contains at least either of the raster data portion and a portion which is not the raster data, such as a portion of a drawing instruction, etc.

The image processing section 22 retains the description in the intermediate language input from the page description language processing section 21 in memory (not shown) and generates the raster data with the print resolution for the portion which is not the raster data while referencing the description in the intermediate language, and then outputs the raster data to the band memory section 24. The image processing section 22 outputs the raster data for the raster data portion to the raster data processing section 23 in order. The image processing section 22 also outputs raster data input from the raster data processing section 23 (information of pixel values) to the band memory section 24.

The raster data processing section 23 makes a comparison between the resolution of the raster data input in order and the print resolution to calculate a scaling factor, scales the data based on the scaling factor, and outputs pixel value information forming the image data after being subjected to the scaling (scaled image data) to the band memory section 24 together with address information specifying the addresses on the band memory section 24 to store the pixel value information.

The band memory section 24 corresponds to second memory in the invention and has a capacity being capable of retaining the image data after being subjected to the scaling as much as the width in the main scanning direction relative to the main scanning direction and at least a part of the scaled image data relative to the subscanning direction. That is, the band memory section 24 has the storage area as much as the number of pixels defined by the print resolution in the printer engine section 13 and the printable width relative to the main scanning direction (row direction), but need not necessarily have the storage area as much as the number of rows corresponding to the printable length relative to the subscanning direction. Page memory having the storage area as much as the number of rows corresponding to the printable length may be used in place of the band memory section 24.

One of the features in the embodiment is processing of the raster data processing section 23. A processing example of the raster data processing section 23 will be discussed. In the description that follows, scale-up processing is taken as an example, but scale-down processing can also be performed in a similar manner.

The buffer memory 28 of the raster data processing section 23 in the embodiment is memory having a capacity equal to or less than the main scanning direction width of raster data.

The input buffer section 25 of the raster data processing section 23 temporarily retains the pixel value information of the raster data input in order and writes the pixel value information into the buffer memory 28. The memory transfer section 26 receives input of information specifying the source address on the buffer memory 28 and the destination address on the band memory section 24 from the scaling control section 27, reads the pixel value information from the specified source address on the buffer memory 28, and transfers the pixel value information to the destination address on the band memory section 24 through the image processing section 22.

The scaling control section 27 makes a comparison between the resolution of the raster data input in order and the print resolution to calculate a scaling factor, determines the address values on the band memory section 24 as the destinations of the pixel value information retained in the buffer memory 28 (destination addresses) in accordance with the scaling factor and outputs the source addresses of the storage locations of the pixel value information and the determined destination addresses to the memory transfer section 26.

The specific basic operation of the scaling control section 27 is as follows: In the description that follows, raster data having W+1 pixels in the main scanning direction is scaled N times in the main scanning direction and M times in the subscanning direction to generate scaled image data, as shown in FIG. 3A.

Assuming that the capacity of the buffer memory 28 is x (here, x is less than or equal to W), x pieces of pixel value information are written into the buffer memory 28 from the input buffer section 25. Specifically in the example in FIG. 3A, x pieces of pixel value information of P0, 0 to P0, x−1 of pixels in the main scanning direction P0, 0 to P0, W are retained in the buffer memory 28.

Figure 3:
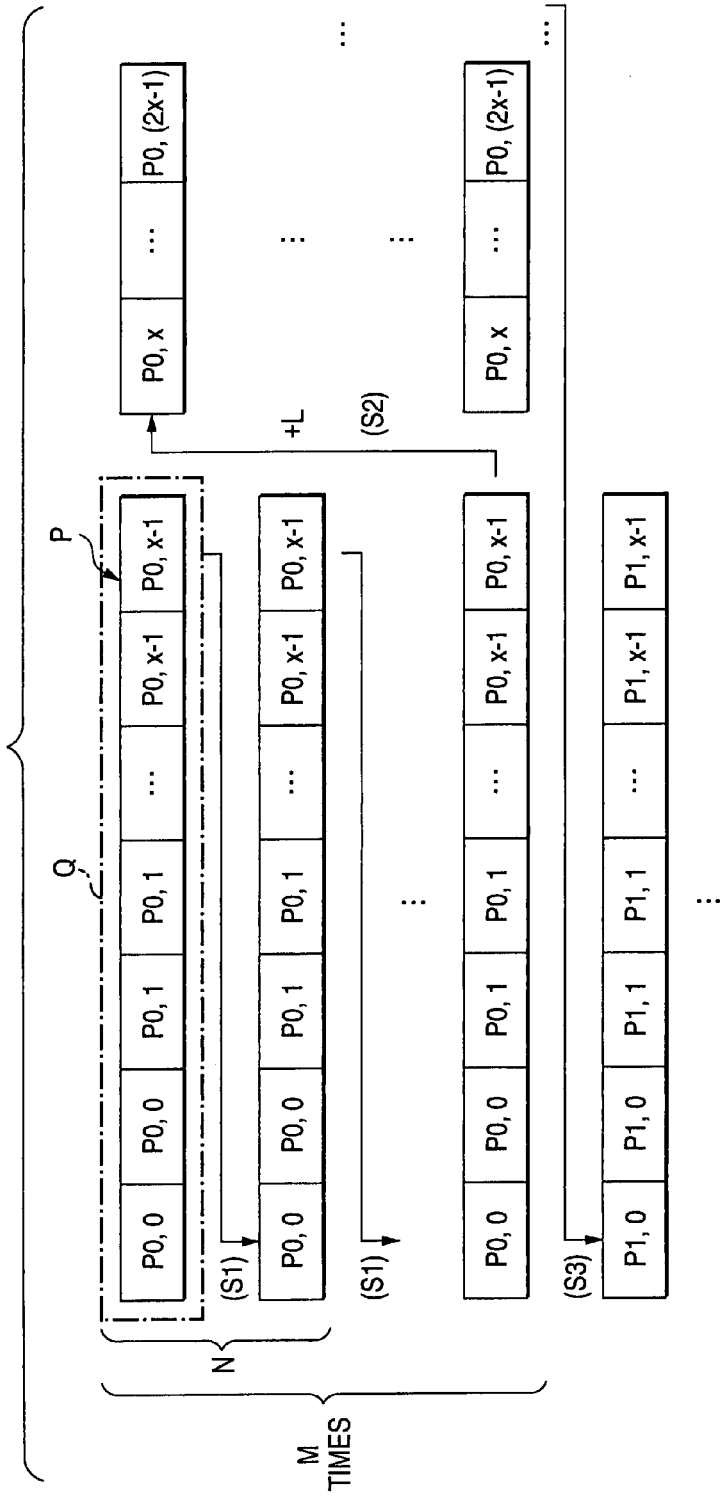
FIGS. 3A and 3B are schematic representations to show an example of the transfer state of pixel value information to a band memory section.

The scaling control section 27 outputs information representing the storage location of the pixel value information of P0, 0 as the source address and also outputs N destination addresses (in FIG. 3, N=2) while incrementing the destination address in the main scanning direction in order starting at the destination address on the band memory section 24 representing the location to store the upper-left pixel of the scaled image data. Then, N pieces of P0, 0 (in the example, two pieces) are transferred to the band memory section 24 consecutively in the main scanning direction (P), as shown in FIG. 3B.

The scaling control section 27 outputs N destination addresses for each of the source addresses of the pieces of pixel value information P0, 0 to P0, x−1 stored in the buffer memory 28 to form a part of the raster data scaled up N times in the main scanning direction in the band memory section 24 (Q). Hereinafter, such processing in the main scanning direction will be referred to as "main scanning direction processing."

Next, the scaling control section 27 increments the destination address on the band memory section 24 representing the location to store the upper-left pixel of the scaled image data by one in the subscanning direction. For example, if the width of the band memory section 24 in the main scanning direction is L, L is added to the initial destination address (S1). The scaling control section 27 repeats the main scanning direction processing starting at the source address where P0, 0 is stored. Hereinafter, the processing in the subscanning direction will be referred to as "subscanning direction processing."

After repeating the subscanning direction processing M times, the scaling control section 27 informs the input buffer section 25 that the processing is complete, and causes the input buffer section 25 to store the next pixel value information group P0, x to P0, 2x−1 in the buffer memory 28.

The scaling control section 27 increments the destination address on the band memory section 24 representing the location to store the upper-left pixel of the scaled image data by x in the main scanning direction (S2), and again performs the main scanning direction processing and the subscanning direction processing.

The scaling control section 27 thus performs the above-described processing with the x pixel value information groups that can be retained in the buffer memory 28 as a block, which will be hereinafter referred to as "block processing." Upon completion of the processing of one row of the raster data, the scaling control section 27 handles the next row (S3) and repeats the block processing.

The raster data scaled up N×M times is retained in the buffer memory 28, as shown in FIG. 3B.

That is, the scaling control section 27 performs the scale-up processing by transferring each piece of pixel value information from the source address to a plurality of destination addresses. To scale up in the subscanning direction, the scaling control section 27 outputs the same pixel value information while moving the destination addresses in the subscanning direction of the buffer memory 28.

Figure 4:
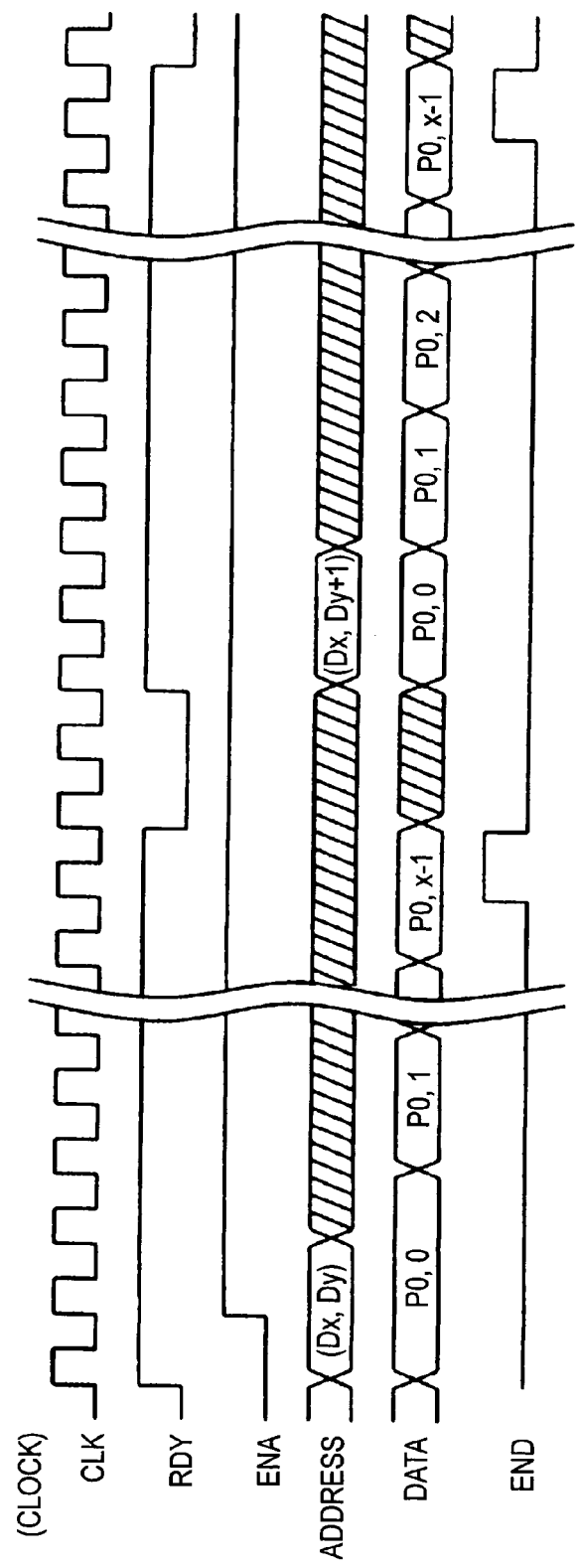
FIG. 4 is a transfer timing chart to show examples of signals output by a scaling control section.

FIG. 4 is a transfer timing chart to show examples of signals output by the scaling control section 27. In FIG. 4, RDY is a control signal for indicating that transfer to the band memory section 24 is effective, and ENA is a control signal for indicating that the band memory section 24 can accept data transfer. ADDRESS is a destination address applied when RDY is asserted. DATA is pixel value information and END is a control signal for indicating that burst transfer (here, burst transfer of one row of x pieces of pixel value information is executed) terminates.

In the scale-up system, the raster data is input in the scan line order, but is not necessarily transferred from the buffer memory 28 to the band memory section 24 in the scan line order (scanning in the subscanning direction is executed with a block of x pieces at a time). When transfer of the first pixel value information P0, 0 is started, the pixel value information is transferred to the destination address of (Dx, Dy). After this, the information is transferred in order in the main scanning direction and therefore, as shown in FIG. 4, the scaling control section 27 need not necessarily specify the destination address and the band memory section 24 may store the information while incrementing the destination address in order in the main scanning direction.

As shown in FIG. 4, when the pixel value information P0, x−1 at the termination of the block is transferred, the END signal is generated, indicating the termination of scaling up of one row in the main scanning direction. When transfer of scale-up data P0, 0 is again started, the scaling control section 27 starts the transfer at the destination address of (Dx, Dy+1) for scaling up in the sub scanning direction. To scale down, the pixel value information is thinned out for transfer.

The processing of the scaling control section 27 will be discussed in more detail. The program executed by the scaling control section 27 function ally includes the memory control section 31, the main scanning direction scaling section 32, the main scanning direction scaling control section 33, the subscanning direction scaling control section 34, and the transfer control section 35, as previously shown in FIG. 2. The memory control section 31 controls transfer of input pixel value information and the buffer memory 28. The main scanning direction scaling section 32 scales the pixel value information transferred in block units in the main scanning direction (main scanning direction processing).

The main scanning direction scaling control section 33 performs scaling calculation in the main scanning direction and generates the destination address signal, etc. The subscanning direction scaling control section 34 performs scaling calculation in the subscanning direction and outputs a control signal for causing the main scanning direction scaling control section 33 to repeat processing for each block to scale in the subscanning direction. The transfer control section 35 monitors the RDY signal and when transfer is enabled, outputs the destination address signal and controls transfer of pixel value information. Upon completion of one row of one block, the transfer control section 35 generates and outputs the END signal.

In the description made so far, the scaling factor is an integer. However, the scaling factor may contain one or more decimal places. In this case, the destination address is determined in a similar manner to that described above, but which pixel value information is to be transferred to each destination address must be determined in response to the scaling factor. That is, when the scaling factor is an integer such as two (twice) or three (three times), the pixel value information maybe repeatedly output as many times as the number of times indicated by the scaling factor; however, if the scaling factor is a scaling factor containing a decimal place, such as 1.2 (times), five pieces of pixel value information are transferred to a six-pixel memory area. That is, only any one piece of pixel value information is transferred twice and other pieces are transferred each once; it is necessary to determine pixel value information at which source address is to be transferred to each destination address.

In the embodiment, processing is performed for each block in the main scanning direction and thus if simple scaling is performed for each block, it is feared that the block boundaries may be conspicuous on the scaled image data in processing responsive to the scaling factor having decimal places, etc.

Then, the scaling control section 27 in the embodiment basically generates the source address in the buffer memory 28 storing the pixel value information to be transferred to each destination address on the band memory section 24 for retention based on the address shift amount determined in response to the scaling factor, reads the pixel value information from the generated source address in the buffer memory 28, and transfers the pixel value information to the destination address on the band memory section 24. The address shift amount at the termination of the previous process block is retained and to perform processing of the next block, the retained address shift amount is used in the next block to continue the source address determination processing.

Figure 5:
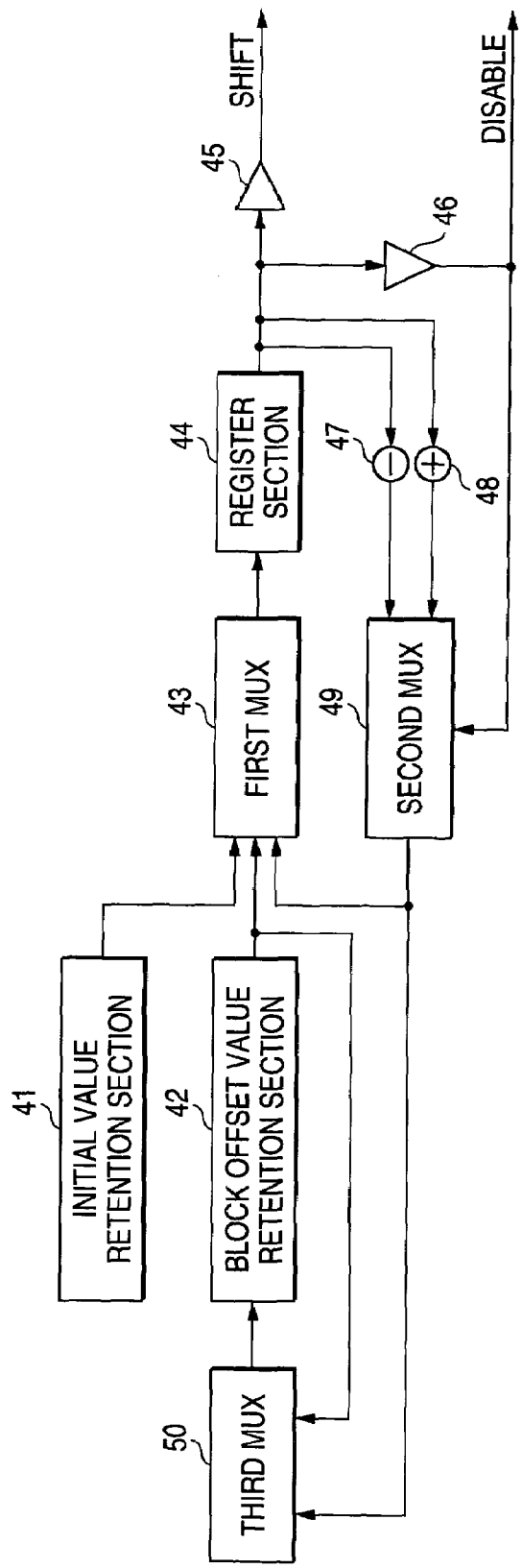
FIG. 5 is a functional block diagram to show a basic configuration example of processing performed by a main scanning direction scaling control section and a subscanning direction scaling control section.

This processing specifically is performed by the main scanning direction scaling control section 33 and the subscanning direction scaling control section 34. Next, the basic configuration of the control sections will be discussed with FIG. 5. FIG. 5 is a function al block diagram to show a configuration example of the main scanning direction scaling control section 33 or the subscanning direction scaling control section 34.

As in the configuration example shown in FIG. 5, the main scanning direction scaling control section 33 or the subscanning direction scaling control section 34 includes an initial value register 41, a block offset value register 42, a first selection section 43, a register section 44, a first comparison section 45, a second comparison section 46, a subtraction section 47, an addition section 48, a second selection section 49, and a third selection section 50.

The initial value register 41 retains the initial value determined by a predetermined method and outputs the initial value. The method of determining the initial value is described later in detail. The block offset value register 42 retains the offset value when the last pixel value information is output in the previous block processing as the block offset value. The offset value is the value found by performing cumulative addition of the address shift amounts and typically is the fractional portion of the cumulative addition al value.

Figure 6:
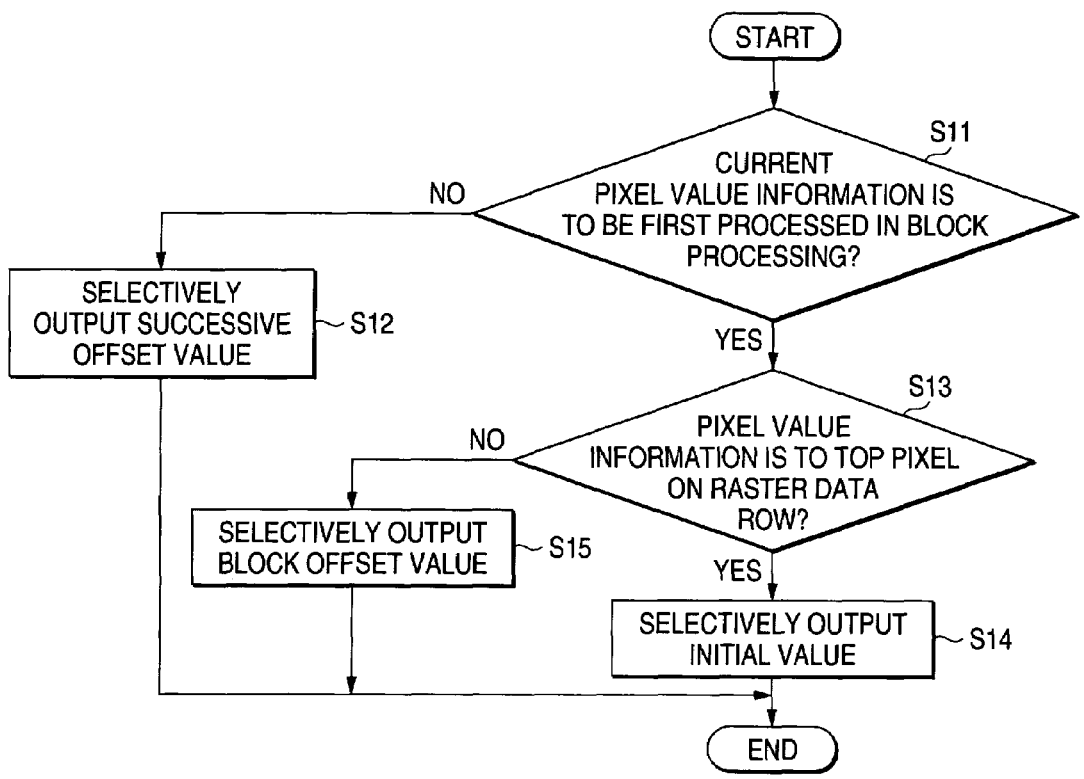
FIG. 6 is a flowchart to show an operation example of a first selection section in the main scanning direction scaling control section.

The first selection section 43, which is a multiplexer (MUX), receives input of the initial value from the initial value register 41, input of the block offset value from the block offset value register 42, and input of the current offset value, which will be hereinafter referred to as the successive offset value, from the second selection section 49 described later, and selects any of the values based on a predetermined condition. Specifically, the first selection section 43 in the main scanning direction scaling control section 33 selectively outputs any of the input values by performing processing as shown in FIG. 6. That is, whether or not the pixel value information indicated by the source address is to be first processed in the block processing for each block is checked (S11). If the pixel value information is not to be first processed (NO at S11), the successive offset value is selectively output (S12) and the processing is terminated.

If it is determined at S11 that the pixel value information indicated by the source address is to be first processed in the block processing (YES at S11), further whether or not the pixel value information is the information of the top pixel on the raster data row, namely, is the information of the top pixel in the main scanning direction is checked (S13). If the pixel value information is the information of the top pixel (YES at S13), the initial value is selectively output (S14) and the processing is terminated. If the pixel value information is not the information of the top pixel (NO at S13), the block offset value is selectively output (S15) and the processing is terminated.

Figure 7:
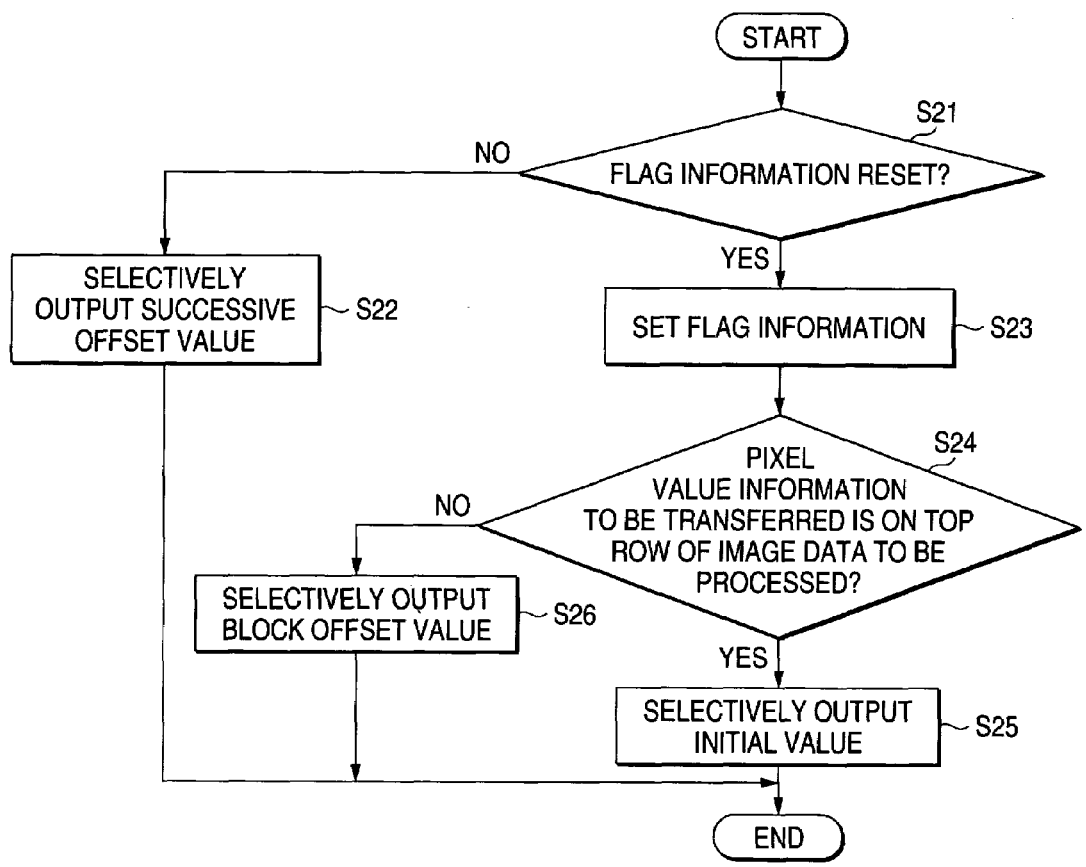
FIG. 7 is a flowchart to show an operation example of a first selection section in the subscanning direction scaling control section.

The first selection section 43 in the subscanning direction scaling control section 34 uses a register for retaining flag information (not shown) and resets the flag information to "0," etc., for example, at the timing at which pixel value information is written in to the buffer memory 28 from the input buffer section 25 (just after start of the processing, just after output of the previous END signal, or the like). As shown in FIG. 7, the first selection section 43 checks whether or not the flag information is reset to "0," etc., namely, checks whether or not the current pixel value information stored in the buffer memory 28 is the information first read this time (S21). If the flag information is not reset to "0", etc., (NO at S21), the successive offset value is selectively output (S22) and the processing is terminated.

If the flag information is reset to "0", etc., (YES at S21), the flag information is set to "1", for example (S23), and further whether or not the pixel value information to be transferred is the information on the top row of the image data to be processed is checked (S24). If the pixel value information is the information on the top row of the image data to be processed (YES at S24), the initial value is selectively output (S25) and the processing is terminated. If the pixel value information to be transferred is not the information on the top row of the image data to be processed (NO at S24), the block offset value is selectively output (S26) and the processing is terminated. That is, in the subscanning direction, the address shift amount at the point in time upon completion of scaling the pixel value information written in to the buffer memory 28 in the subscanning direction (the shift amount in the subscanning direction) is retained as the block offset value for use.

The register section 44 temporarily retains the output value of the first selection section 43, outputs the integer part of the retained value to the first comparison section 45 and the second comparison section 46, outputs the fractional part to the addition section 48, and outputs the retained value. (integer part and fractional part) to the subtraction section 47. The first comparison section 45 determines whether or not the value of the integer part of the value retained in the register section 44 is "1" or more. If the value of the integer part exceeds "1", the first comparison section 45 outputs a signal for incrementing the source address by one (shift signal). Specifically, the first comparison section 45 in the main scanning direction scaling control section 33 increments the source address by one in the main scanning direction according to the shift signal. The first comparison section 45 in the subscanning direction scaling control section 34 increments the source address by one in the subscanning direction according to the shift signal.

The second comparison section 46 determines whether or not the value of the integer part of the value retained in the register section 44 is "2" or more. If the value of the integer part is "2" or more, the second comparison section 46 outputs a disable signal for suppressing output of the destination address and pixel value information. When the disable signal is output, the main scanning direction scaling control section 33 does not output the destination address or pixel value information.

The subtraction section 47 subtracts "1" from the value retained in the register section 44 and outputs the result. The addition section 48 adds the reciprocal of the scaling factor as the address shift amount to the fractional part of the value retained in the register section 44 and outputs the result. The output of the addition section 48 is the result of the cumulative addition calculation of the address shift amounts. That is, the address shift amount corresponds to the scaling factor of the original raster data when the scaled image data is "1", and indicates the pixel move amount containing the decimal places in terms of the original raster data per pixel of the scaled image data.

The second selection section 49, which is a multiplexer (MUX), selectively outputs the output value of the subtraction section 47 when the second comparison section 46 outputs a disable signal; selectively outputs the output value of the addition section 48 when the second comparison section 46 does not output a disable signal. The output value of the second selection section 49 becomes the successive offset value.

The third selection section 50, which is a multiplexer (MUX), updates the value of the block offset value register 42 when the pixel value information at the termination of the block is output. Specifically, the third selection section 50 in the main scanning direction scaling control section 33 determines whether or not the information corresponds to the termination pixel of the block, for example, based on the END signal, etc. If the information corresponds to the termination pixel, the third selection section 50 selectively outputs the successive offset value and updates the block offset value retained in the block offset value register 42. If the information does not correspond to the termination pixel of the block, the third selection section 50 outputs the block offset value output by the block offset value register 42 intact to the block offset value register 42.

The third selection section 50 in the subscanning direction scaling control section 34 determines whether or not the information corresponds to the termination pixel of the block, namely, the pixel at the right end of each row of raster data, for example, based on the read address, etc. If the information corresponds to the termination pixel, the third selection section 50 selectively outputs the successive offset value and updates the block offset value retained in the block offset value register 42. If the information does not correspond to the termination pixel of the block, the third selection section 50 outputs the block offset value output by the block offset value register 42 intact to the block offset value register 42.

An example of the method of determining the initial value retained in the initial value register 41 will be discussed. When a part of scaled image data has been stored up to the capacity of the band memory section 24, the scaling control section 27 in the embodiment causes the main scanning direction scaling control section 33 and the subscanning direction scaling control section 34 to retain the successive offset value at the point in time in the initial value register 41. That is, the scaled image data is divided as much as the number of rows in the subscanning direction of the band memory section 24 and is printed. As the initial value is thus set, the disorder of the scaled image data in the boundary between the divisions (across the bands) is prevented. To use page memory in place of the band memory section 24, basically the initial value need not be set and can be set to "0". In such a case, the initial value register 41 is not necessarily required.

Next, an operation example of the main scanning direction scaling control section 33 for performing the processing shown in FIG. 5 will be discussed. Here, the main scanning direction scaling control section 33 will be discussed, but the same description is also applied to the subscanning direction scaling control section 34.

The operation when the scaling factor is 4/3 (the reciprocal of the scaling factor is 0.75) and the initial value is 0.6 will be discussed with reference to FIG. 8. When the pieces of pixel value information P0, 0 to P0, x−1 are stored in the buffer memory 28 and block processing for the block consisting of the pieces of pixel value information P0, 0 to P0, x−1 is started, for the first pixel value information P0, 0, the first selection section 43 selectively outputs the initial value 0.6 because the pixel value information is first processed in the block processing and corresponds to the top pixel on the raster data row. The register section 44 retains the initial value.

Since the integer part of the value 0.6 retained in the register section 44 is "0", neither the shift signal nor the disable signal is output. Therefore, the source address is not incremented and the next output pixel value information is also P0, 0. The addition section 48 adds the reciprocal of the scaling factor, 0.75, to 0.6 in the fractional part and outputs the result value 1.35. The subtraction section 47 subtracts 1 from 0.6 and outputs the result −0.4.

Since the disable signal is not output, the second selection section 49 selectively outputs the output value of the addition section 48, 1.35, as the successive offset value.

Since the next pixel value information is not first processed in the block processing although it is P0, 0, the first selection section 43 selectively outputs the successive offset value. The register section 44 retains the successive offset value. Since the integer part of the value is "1", the shift signal is output, but the disable signal is not output. Since the shift signal is output, the source address is incremented and the next output pixel value information becomes P0, 1.

The addition section 48 adds the reciprocal of the scaling factor, 0.75, to 0.35 in the fractional part of the output value of the first selection section 43 and outputs the result value 1.10. In this case, the disable signal is not output either and thus the second selection section 49 outputs the output value of the addition section 48, 1.10, as the successive offset value. Since the pixel value information is not the first pixel value information in the block processing, the first selection section 43 outputs the successive offset value intact to the register section 44.

As similar processing is repeated, the pixel value information is output like "P0, 0, P0, 0, P0, 1, P0, 2, P0, 2, P0, 3, P0, 4, . . . " as shown in the column f in FIG. 8. If the shift signal is output in the processing of the pixel at the termination of the block (for example, P0, 5), the third selection section 50 updates the value of the block offset value register 42 (block offset value) according to the successive offset value 1.35 at the point in time.

When the processing in the subscanning direction terminates and the pieces of pixel value information P0, x to P0, (2x−1) of the next block are stored in the buffer memory 28, the first selection section 43 starts new block processing. The pixel value information P0, x first processed in the started block processing is not the top pixel value information on the raster data row although it is first processed in the block processing. Thus, the first selection section 43 outputs the block offset value 1.35 retained in the block offset value register 42.

Scaling down of raster data will be discussed with FIG. 9 assuming that the scaling factor is ⅔, namely, the reciprocal of the scaling factor is 1.5 and the initial value is 1.0. When the pieces of pixel value information P0, 0 to P0, x−1 are stored in the buffer memory 28 and block processing for the block consisting of the pieces of pixel value information P0, 0 to P0, x−1 is started, for the first pixel value information P0, 0, the first selection section 43 selectively outputs the initial value 1.0 because the pixel value information is first processed in the block processing and corresponds to the top pixel on the raster data row. The register section 44 retains the initial value.

Since the integer part of the value 1.0 retained in the register section 44 is 1, the shift signal is output and the disable signal is not output. Therefore, the source address is incremented and the next output pixel value information becomes P0, 1. The addition section 48 adds the reciprocal of the scaling factor, 1.5, to 0.0 in the fractional part and outputs the result value 1.5. The subtraction section 47 subtracts 1 from 1.0 and outputs the result 0.

Since the disable signal is not output, the second selection section 49 selectively outputs the output value of the addition section 48, 1.50, as the successive offset value.

Since the next pixel value information is P0, 1 and is not first processed in the block processing, the first selection section 43 selectively outputs the successive offset value. The register section 44 retains the successive offset value. Since the integer part of the value is "1", the shift signal is output, but the disable signal is not output. Since the shift signal is output, the source address is incremented and the next output pixel value information becomes P0, 2.

The addition section 48 adds the reciprocal of the scaling factor, 1.5, to 0.5 in the fractional part of the output value of the first selection section 43 and outputs the result value 2.0. At this point in time, the disable signal is not output either and thus the second selection section 49 outputs the output value of the addition section 48, 2.0, as the successive offset value. Since the pixel value information is not the first pixel value information in the block processing, the first selection section 43 outputs the successive offset value intact to the register section 44.

Since the integer part of the value stored in the register section 44 is "2", both the shift signal and the disable signal are output. Consequently, the pixel value information P0, 2 being processed is not output. Since the disable signal is output, the second selection section 49 selectively outputs the output value of the subtraction section 47, "1" (namely, the value resulting from subtracting 1 from 2.0).

As similar processing is repeated, the pixel value information is output like "P0, 0, P0, 1, P0, 3, P0, 4, P0, 6, P0, 7, . . . " as shown in f in FIG. 9. In f in FIG. 9, "−" indicates that the pixel value information to be output does not exist.

The pixel value information thus output in order is stored in order in the locations on the band memory section 24, indicated by destination address information separately generated, as shown in FIG. 3, to generate scaled image data in the band memory section 24.

Thus, in the image processing apparatus according to the embodiment, for the image data received in the image data input section 11, the page description language processing section 21 of the raster data generation section 12 generates raster data for the portion which is not raster data, such as vector data, based on the description, and writes the generated raster data in to the band memory section 24 through the image processing section 22. The page description language processing section 21 outputs the portion of raster data to the raster data processing section 23.

The raster data processing section 23 scales the raster data input in the raster scan order from the page description language processing section 21 according to the scaling factor specified by a ratio between the resolution of the raster data (for example, given by the description in the page description language) and the print resolution in the printer engine section 13, and writes the data in to the band memory section 24 through the image processing section 22. At the time, the raster data processing section 23 divides one-row data of the raster data into blocks of a predetermined size, stores the data in the buffer memory 28 of the block size, calculates the source address on the buffer memory 28 and the destination address on the band memory section 24 for each piece of the pixel value information contained in the block, and transfers the pixel value information from the source address of the buffer memory 28 to the destination address of the band memory section 24.

Accordingly, for the raster data portion of the image data, the data provided by scaling the raster data portion to be fitted for the print resolution in the printer engine section 13 (scaled image data) is retained in the band memory section 24, for any other portion than the raster data, such as vector data, the raster data with the print resolution generated based on the description of the data is retained in the band memory section 24.

The data stored in the band memory section 24 is output to the printer engine section 13 for printing. Since the band memory section 24 does not have a sufficient capacity to represent the image on the whole print paper in the subscanning direction, two or more band memory sections can be provided so that drawing is executed in a different band memory section to print one sheet of paper while outputting from the printer engine section 13. Drawn band memory data may be compressed and when the compressed data for one sheet of paper is provided, it may be output to the printer engine section 13 while the data is decompressed.

According to the embodiment of the invention, input image data with the number of pixels in the main scanning direction exceeding the capacity of the buffer memory 28 can also be processed, and scaling in the main scanning direction and that in the subscanning direction can be performed at a time.

In the description made so far, it is assumed that the sections are control led by the software; however, the processing in FIG. 5, etc., for example, may be implemented as hardware of digital circuit devices.

What is claimed is:

1. An image processing apparatus for generating scaled image data that is obtained by scaling the image data according to a specified scaling factor, the image processing apparatus comprising:
   an image data input section that receives input of image data described in a page description language;
   a page description language processing section that converts the page description language input image data;
   a receiver that receives an input of pixel value information of each pixel which is contained in the converted image data to be processed in raster scan order;
   a first memory that stores the pixel value information input in the raster scan order, a maximum capacity of the first memory being less than a memory capacity needed to store the pixel image data of a full scanning line in a main scanning direction;
   a second memory that retains the scaled image data of an entire scanning line's worth of pixel data and the scaled image data of a plurality of subscanning lines relative to a subscanning direction;
   a destination address generator that generates destination address information in the second memory to specify a destination location of the pixel value information stored in the first memory in response to the specified scaling factor; and
   a transferring unit that transfers the pixel value information from the first memory to the second memory based on the generated destination address information.

2. The image processing apparatus as claimed in claim 1 further comprising:
   a dividing unit that divides the image data into pixel blocks of a size defined based on the capacity of the first memory, wherein
   the first memory stores the pixel value information contained in the divided pixel block.

3. The image processing apparatus as claimed in claim 1 further comprising a dividing unit that divides the image data into a pixel block of a size of the maximum capacity of the first memory,
   wherein the destination address generator generates the destination address information in the subscanning direction of the pixel block, after the destination address generator generates the destination address information of the main scanning direction width of the pixel block in response to the specified scaling factor.

4. An image processing apparatus for generating scaled image data that is obtained by scaling the image data according to a specified scaling factor, the image processing apparatus comprising:
   an image data input section that receives input of image data described in a page description language;
   a page description language processing section that converts the page description language input image data;
   a receiver that receives an input of pixel value information of each pixel which is contained in the converted image data to be processed in raster scan order;
   a first memory that stores the pixel value information input in the raster scan order, a maximum capacity of the first memory being less than a memory capacity needed to store the pixel image data of a full scanning line in a main scanning direction;
   a second memory that retains the scaled image data of an entire scanning line's worth of pixel data and the scaled image data of a plurality of subscanning lines relative to a subscanning direction;
   a source address generating unit that generates a source address information in the first memory that stores the pixel value information to be retained in each address in the second memory based on an address shift amount determined in response to the specified scaling factor; and
   a transferring unit that transfers the pixel value information from the first memory to the second memory based on the generated source address information.

5. The image processing apparatus as claimed in claim 4 further comprising:
   a dividing unit that divides the image data into pixel blocks of a size defined based on the capacity of the first memory, wherein
   the first memory stores the pixel value information contained in the divided pixel block.

6. The image processing apparatus as claimed in claim 4, wherein the source address generating unit generates the source address using an offset value;
   the offset value is provided based on a cumulative addition calculation of the address shift amount; and
   the source address generating unit includes:
      a retaining unit that retains at least a decimal place of the offset value at a point after the pixel value information is transferred.

7. The image processing apparatus as claimed in claim 6, wherein the source address generating unit further includes:
   an initial value retaining unit that retains at least the decimal place of the offset value at the point when the pixel value information has been transferred as much as a capacity of the second memory as an initial value of a next source address calculation, if the second memory cannot retain the pixel value information as much as the subscanning direction width of the scaled image data.

8. The image processing apparatus as claimed in claim 7, wherein the address shift amount is a reciprocal of the specified scaling factor; and
the source address generating unit updates the offset value by adding the address shift amount to the current offset value, and increments the source address by one if the updated offset value becomes one or more.

9. The image processing apparatus as claimed in claim 7, wherein the address shift amount is a reciprocal of the specified scaling factor; and
the source address generating unit updates the offset value by adding the address shift amount to the current offset value, increments the source address by one if the updated offset value becomes one or more, refers to a location of the pixel value information stored in the first memory on the image data to be processed, and sets the offset value to the initial value retained in the initial value retaining unit if the location satisfies a predetermined condition.

10. The image processing apparatus as claimed in claim 6, wherein the address shift amount is a reciprocal of the specified scaling factor; and
the source address generating unit updates the offset value by adding the address shift amount to the current offset value, and increments the source address by one if the updated offset value becomes one or more.

11. The image processing apparatus as claimed in claim 4, wherein the source address generating unit generates the source addresses using respective offset values relative to the main scanning direction and the subscanning direction;
the respective offset values are provided by performing a cumulative addition calculation of the address shift amounts responsive to the scaling factor in the main scanning direction and that in the subscanning direction; and
the source address generating unit includes:
a first retaining unit that retains at least a decimal place of the offset value relative to the main scanning direction at a point after the pixel value information is transferred; and
a second retaining unit that retains at least a decimal place of the offset value relative to the subscanning direction.

12. The image processing apparatus as claimed in claim 11, wherein the address shift amount is a reciprocal of the specified scaling factor; and
the source address generating unit updates the offset value by adding the address shift amount to the current offset value, and increments the source address by one if the updated offset value becomes one or more.

13. An image processing method for generating scaled image data that is obtained by scaling the image data according to a specified scaling factor, the image processing method comprising:
receiving input of image data described in a page description language;
converting the page description language input image data;
receiving an input of pixel value information of each pixel which is contained in the converted image data to be processed in raster scan order;
storing the pixel value information input in the raster scan order in a first memory, a maximum capacity of the first memory being less than a memory capacity needed to store the pixel image data of a full scanning line in a main scanning direction;
generating destination address information in the second memory to specify a destination location of the pixel value information stored in the first memory in response to the specified scaling factor, wherein the second memory retains the scaled image data of an entire scanning line's worth of pixel data and the scaled image data of a plurality of subscanning lines relative to a subscanning direction; and
transferring the pixel value information from the first memory to a second memory based on the generated destination address information.

14. The image processing method as claimed in claim 13 further comprising dividing the image data into a pixel block of a size of the maximum capacity of the first memory,
wherein the destination address information in the subscanning direction of the pixel block is generated, after generating the destination address information of the main scanning direction width of the pixel block in response to the specified scaling factor.

15. An image processing method for generating scaled image data that is obtained by scaling the image data according to a specified scaling factor, the image processing method comprising:
receiving input of image data described in a page description language;
converting the page description language input image data;
receiving an input of pixel value information of each pixel which is contained in the converted image data to be processed in raster scan order;
storing the pixel value information input in the raster scan order in a first memory, a maximum capacity of the first memory being less than a memory capacity needed to store the pixel image data of a full scanning line in a main scanning direction;
generating a source address information in the first memory that stores the pixel value information to be retained in each address in the second memory, that retains the scaled image data of an entire scanning line's worth of pixel data and the scaled image data of a plurality of subscanning lines relative to a subscanning direction, based on an address shift amount determined in response to the specified scaling factor; and
transferring the pixel value information from the first memory to a second memory based on the generated source address information.

16. A computer-readable medium comprising an image processing program which, when executed by a computer, cause the computer to perform an image processing method comprising:
receiving input of image data described in a page description language;
converting the page description language input image data;
receiving an input of pixel value information of each pixel which is contained in the converted image data to be processed in raster scan order;
storing the pixel value information input in the raster scan order in a first memory, a maximum capacity of the first memory being less than a memory capacity needed to store the pixel image data of a full scanning line in a main scanning direction;
generating destination address information in the second memory to specify a destination location of the pixel value information stored in the first memory in response to the specified scaling factor, wherein the second memory retains the scaled image data of an entire scanning line's worth of pixel data and the scaled image data of a plurality of subscanning lines relative to a subscanning direction; and transferring the pixel value information from the first memory to a second memory based on the generated destination address information.

17. The computer-readable medium comprising the image processing program as claimed in claim 16, the image processing program which, when executed by the computer, cause the computer to perform an image processing method further comprising dividing the image data into a pixel block of a size of the maximum capacity of the first memory, wherein the destination address information in the subscanning direction of the pixel block is generated, after generating the destination address information of the main scanning direction width of the pixel block in response to the specified scaling factor.

18. A computer-readable medium comprising an image processing program which, when executed by a computer, cause the computer to perform an image processing program comprising:

receiving input of image data described in a page description language;

converting the page description language input image data;

receiving an input of pixel value information of each pixel which is contained in the converted image data to be processed in raster scan order;

storing the pixel value information input in the raster scan order in a first memory, a maximum capacity of the first memory being less than a memory capacity needed to store the pixel image data of a full scanning line in a main scanning direction;

generating a source address information in the first memory that stores the pixel value information to be retained in each address in the second memory, that retains the scaled image data of an entire scanning line's worth of pixel data and the scaled image data of a plurality of subscanning lines relative to a subscanning direction, based on an address shift amount determined in response to the specified scaling factor; and transferring the pixel value information from the first memory to a second memory based on the generated source address information.

* * * * *